United States Patent
Chiu

(10) Patent No.: US 7,714,900 B2
(45) Date of Patent: May 11, 2010

(54) COLOR INTERPOLATION PROCESSING METHOD

(75) Inventor: Shang-Kai Chiu, Hsinchu (TW)

(73) Assignee: Nuvotron Technology Corporation, Hsinchu (TW)

( * ) Notice: Subject to any disclaimer, the term of this patent is extended or adjusted under 35 U.S.C. 154(b) by 790 days.

(21) Appl. No.: 11/589,119

(22) Filed: Oct. 30, 2006

(65) Prior Publication Data
US 2007/0222868 A1    Sep. 27, 2007

(30) Foreign Application Priority Data
Mar. 23, 2006    (TW) ............................. 95110034 A

(51) Int. Cl.
*H04N 5/228* (2006.01)
(52) U.S. Cl. ............... 348/222.1; 348/223.1; 348/272; 348/273; 382/300
(58) Field of Classification Search ............. 348/223.1, 348/222.1, 272, 273; 382/300
See application file for complete search history.

(56) References Cited

U.S. PATENT DOCUMENTS

| 6,091,862 | A | * | 7/2000 | Okisu | 382/300 |
| 6,570,616 | B1 | * | 5/2003 | Chen | 348/272 |
| 6,744,916 | B1 | * | 6/2004 | Takahashi | 382/162 |
| 2006/0078229 | A1 | * | 4/2006 | Huang et al. | 382/300 |

FOREIGN PATENT DOCUMENTS

TW    I246851    3/2005

* cited by examiner

*Primary Examiner*—Luong T Nguyen
*Assistant Examiner*—Antoinette T Spinks
(74) *Attorney, Agent, or Firm*—Muncy, Geissler, Olds & Lowe, PLLC

(57) ABSTRACT

A scene is captured. A two-dimensional matrix comprising a plurality of image detection components is generated according to the captured scene. Each image detection component corresponds to one color component. A plurality of matrixes are generated according to the image detection components. One image detection component and a portion of matrixes are calculated to obtain the missing color components.

8 Claims, 5 Drawing Sheets

| R | G | R1 | G | R |
|---|---|---|---|---|
| G | B2 | G3 | B4 | G |
| R5 | G6 | R7 | G8 | R9 |
| G | B10 | G11 | B12 | G |
| R | G | R13 | G | R |

FIG. 1b

| C00 | C01 | C02 |
|-----|-----|-----|
| C10 | C11 | C12 |
| C20 | C21 | C22 |

| D00 | D01 | D02 |
|-----|-----|-----|
|     |     |     |
| D20 | D21 | D22 |

| E00 |  | E02 |
|-----|--|-----|
| E10 |  | E12 |
| E20 |  | E22 |

| F00 | F01 | F02 |
|-----|-----|-----|
| F10 | F11 | F12 |
| F20 | F21 | F22 |

COLOR INTERPOLATION PROCESSING METHOD

BACKGROUND OF THE INVENTION

1. Field of the Invention

The invention relates to a processing method, and more particularly to a color interpolation processing method.

2. Description of the Related Art

FIG. 1a shows a structure for an image sensor module. Scene is captured by lens 11. A color filter array (CFA) 12 comprises color filters R, B, and G for acquiring color components. A charged-coupled device (CCD) 13 or an active pixel sensor (APS) comprises a plurality of pixel units. Each pixel unit transforms color components into electronic signals and stores the electronic signals.

One color component is acquired by one color filter. Thus, only one color component is available in each pixel unit such that the other two of the three color components are missing from each pixel unit. To completely display the scene 10, various color interpolation methods are utilized. The color interpolation methods determine the other two missing color components according to the filtered and stored color component.

One color interpolation method by S. C.Pei et al in IEEE Trans. Circuits and Systems for Video Technology, VOL. 13, NO. 6, June 2003 describes "Effective Color Interpolation in CCD Color Filter Arrays Using Signal Correlation".

FIG. 1b is a schematic diagram of the CFA. The color interpolation method disclosed by S. C. Pei et al obtains a missing G7 value according to a known R7 value. The missing G7 value can be recovered as (1).

$$G7 = R7 + \frac{1}{4}(K_R3 + K_R6 + K_R8 + K_R11) \quad (1)$$

wherein, $K_R3$ is defined as in (2), $K_R6$ is defined as in (3), $K_R8$ is defined as in (4), and $K_R11$ is defined as in (5).

$$K_R3 = G3 - R3 = G3 - \frac{1}{2}(R1 + R7) \quad (2)$$

$$K_R6 = G6 - R6 = G6 - \frac{1}{2}(R5 + R7) \quad (3)$$

$$K_R8 = G8 - R8 = G8 - \frac{1}{2}(R7 + R9) \quad (4)$$

$$K_R11 = G11 - R11 = G11 - \frac{1}{2}(R7 + R13) \quad (5)$$

A missing B7 value can be obtained according to the missing G7 value defined by (1). The missing B7 value is calculated as $$B7 = G7 + \frac{1}{4}(K_B2 + K_B4 + K_B10 + K_B12) \quad (6)$$

wherein operations of $K_B2$, $K_B4$, $K_B10$, and $K_B12$ are similar to $K_R3$, $K_R6$, $K_R8$, and $K_R11$.

Although the missing value is obtained by the color interpolation method disclosed by S. C. Pei et al, the color interpolation method does not particularly take the edge pattern into account. Therefore, the method would induce the false colors and blur the pattern around the edges.

Another color interpolation method by X.Wang et al in ICICS-PCM 2003 describes "Edge-Adaptive Color Reconsruction for Single-Sensor Digital Camera".

The color interpolation method disclosed by X. Wang et al detects an edge pattern in a G channel and calculates a G value at R or B pixel in the edge pattern. Next, the color interpolation method utilizes a weighted method to calculate an absolute difference value between a horizontal direction of the G channel and a vertical direction of the G channel for obtaining an R value at an unknown R pixel and a B value at an unknown B pixel.

The color interpolation method disclosed by X. Wang et al usually detects the incorrect edge pattern such that the incorrect value is generated. Additionally, since the weighted method is more complex, the cost of the hardware is increased.

Another color interpolation method by Y. M. Wu et al in Image Analysis and Interpretation, 2004. 6th IEEE Southwest Symposium describes "Color Interpolation for Single CCD Color Camera". The color interpolation method utilizes a weighted method to calculate the unknown G, B, R values. The accuracy is higher, however, the cost of the hardware is higher.

BRIEF SUMMARY OF THE INVENTION

Color interpolation processing methods are provided. A scene comprising at least of three preset color components is captured. A two-dimensional matrix is generated according to the scene. The two-dimensional matrix comprises a plurality of image detection components, each corresponding to one of the preset color components. A plurality of matrixes are generated according to the image detection components. Each matrix comprises a plurality of column color difference components or a plurality of row color difference components. The matrixes are divided into a first matrix module and a second matrix module. The column color difference components and the row color difference components among the first or among the second matrix module are calculated to obtain a plurality of operation values according to the corresponding preset color corresponded by a first image detection component among the image detection components. A minimum value among the operation values is determined and served as a minimum operation value. The matrix corresponding to the minimum operation value serves as a minimum color difference variation matrix (MCDVM). The column color difference components or the row color difference components of the MCDVM are calculated to obtain a minimum color difference variation according to the minimum operation value. An average value of the column or the row color difference components of the minimum color difference variation and the first image detection component are calculated to obtain the value of one of unknown color.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 1b is a schematic diagram of the CFA;

FIGS. 4a~4d are schematic diagrams of matrixes.

DETAILED DESCRIPTION OF THE INVENTION

Figure 1A:
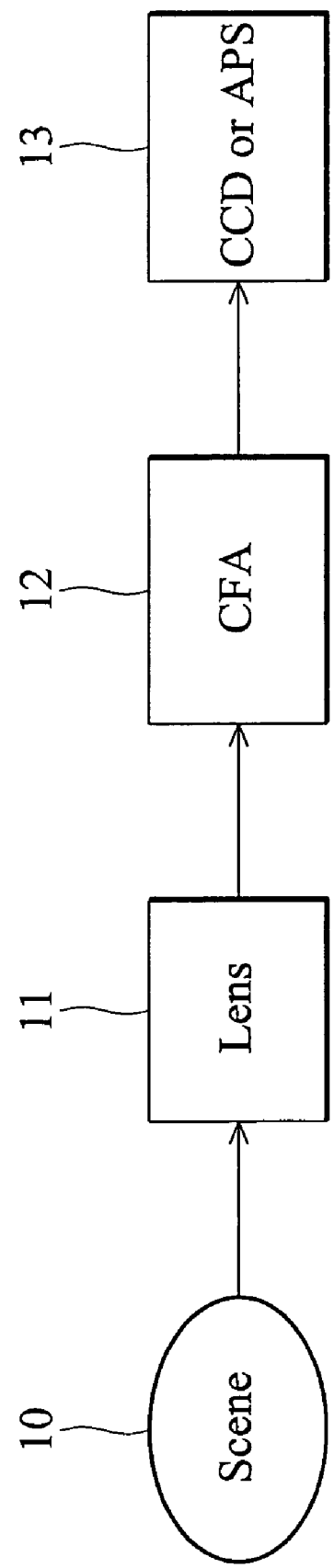
FIG. 1a shows a structure for an image sensor module.
Figure 2:
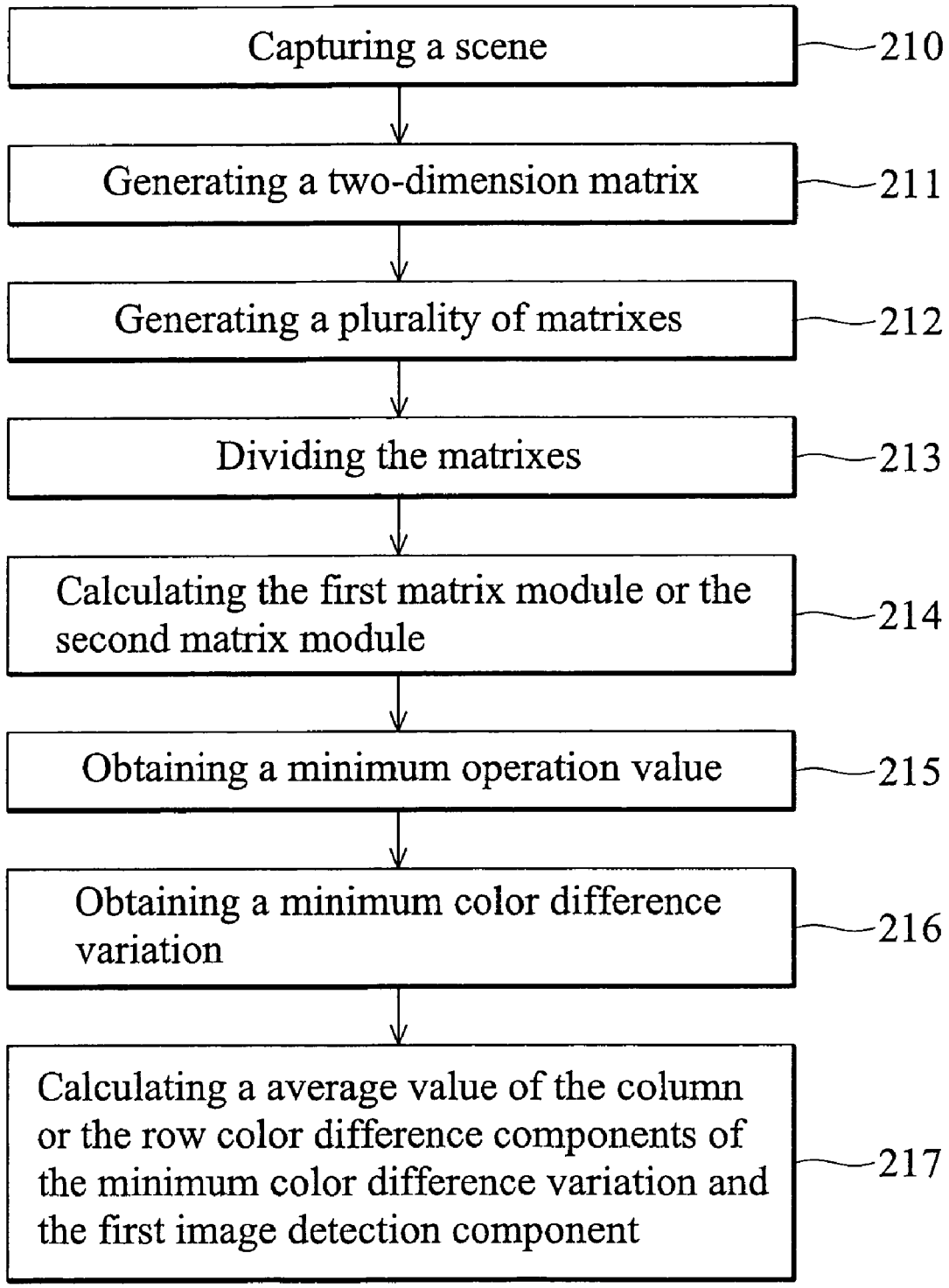
FIG. 2 is a flowchart of an exemplary embodiment of a color interpolation processing method.

FIG. 2 is a flowchart of an exemplary embodiment of a color interpolation processing method. A scene is captured by a capture device (step 210). In this embodiment, the capture device is an image sensor module.

Figure 3A:
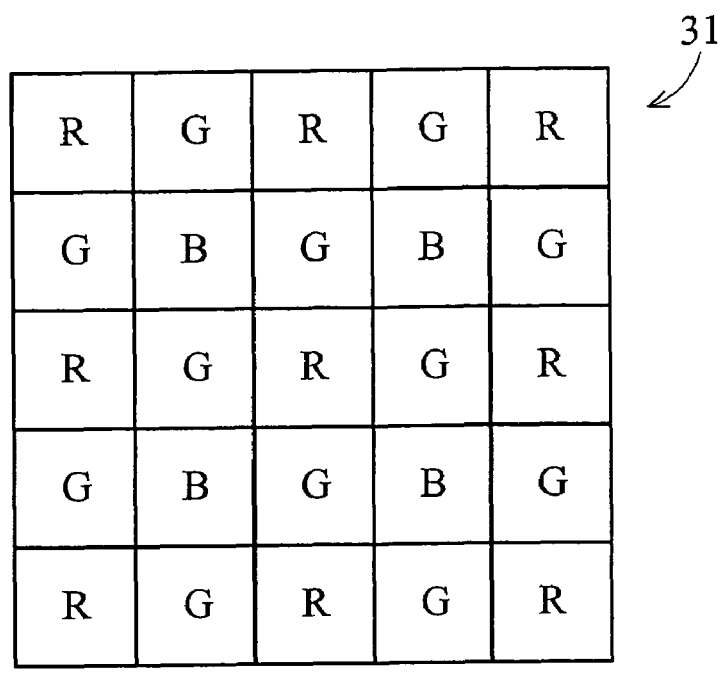
FIG. 3a is a schematic diagram of a Bayer CFA.
Figure 3B:
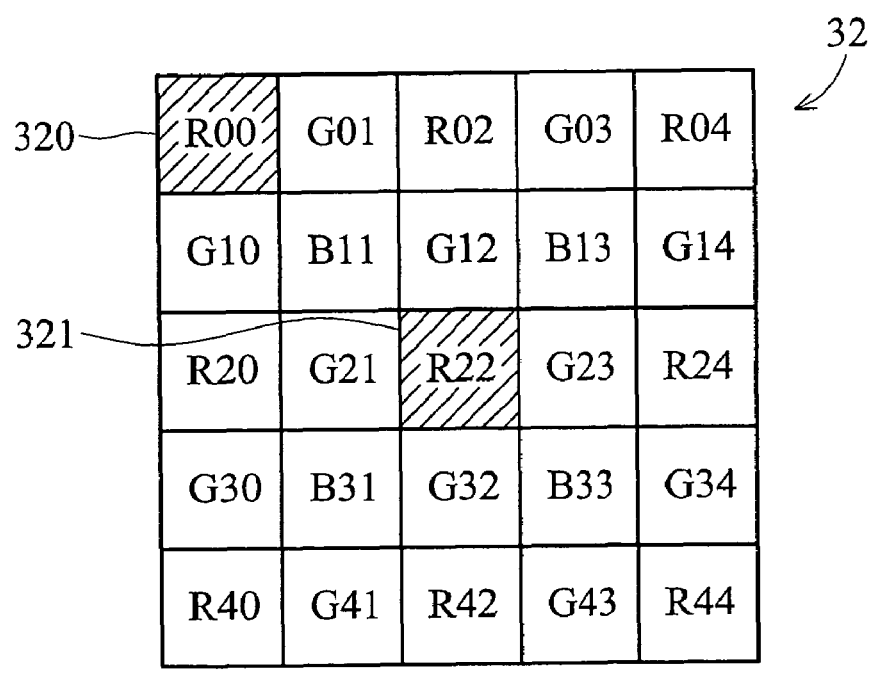
FIG. 3b is a schematic diagram of the two-dimensional matrix.

A two-dimensional matrix is generated according to the captured scene (step 211). In this embodiment, a Bayer CFA 31 is shown as FIG. 3a and filters color components from the captured scene to generate a two-dimensional matrix 32 as shown in FIG. 3b. The Bayer CFA 31 is given as an example, but the disclosure is not limited thereto.

The Bayer CFA 31 comprises color filters R, G, and B for filtering red components, green components, and blue components. A CCD or an APS comprises a plurality of pixel units for transmitting and storing the red component, green component, and blue component. Thus, the two-dimensional matrix 32, as shown in FIG. 3b, is generated. Each pixel unit only stores one color component so that the other two color components are missed. The missing component is not limited to the red component, the green component, or the blue component.

Two-dimensional matrix 32 comprises image detection components R00~R44, G01~G43, and B11~B33 representing the stored data. For example, image detection component R00 shown in FIG. 3b represents a color data stored in a pixel unit 320. In this embodiment, image detection components R00~R44, G01~G43, and B11~B33 respectively correspond to three colors components. For example, image detection components R00~R44 correspond to the red components, image detection components G01~G43 correspond to the green components, and image detection components B11~B33 correspond to the blue components.

A plurality of matrixes are generated according to image detection components R00~R44, G01~G43, and B11~B33 (step 212). Each matrix comprises a plurality of column color difference component and a plurality of row color difference component. In this embodiment, a matrix 41 shown in FIG. 4a is generated by image detection components in odd-columns of two-dimensional matrix 32, a matrix 42 shown in FIG. 4b is generated by image detection components in even-rows of two-dimensional matrix 32, a matrix 43 shown in FIG. 4c is generated by image detection components in even-columns of two-dimensional matrix 32, and a matrix 44 shown in FIG. 4d is generated by image detection components in odd-rows of two-dimensional matrix 32.

Generation of the matrixes 41~44 shown in FIGS. 4a~4d is described in the following. Color difference components C00, C10, and C20 in first column of matrix 41 are generated by image detection components R00, G10, R20, G30, and R40 in first column of two-dimensional matrix 32. The color difference components C00, C10, and C20 can be recovered as (7)~(9).

$$C00 = \frac{(R00 + R20)}{2} - G10 \quad (7)$$

$$C10 = R20 - \frac{(G10 + G30)}{2} \quad (8)$$

-continued $$C20 = \frac{(R20 + R40)}{2} - G30 \quad (9)$$

Color difference components C01, C11, and C21 in the second column of matrix 41 are generated by image detection components R02, G12, R22, G32, and R42 in the third column of two-dimensional matrix 32. Color difference components C02, C12, and C22 in the third column of matrix 41 are generated by image detection components R04, G14, R24, G34, and R44 in fifth column of two-dimensional matrix 32. Since the operations of the color difference components C01, C11, and C21 in the second column of matrix 41 and color difference components C02, C12, and C22 in the third columns of matrix 41 are similar to that of the color difference components C00, C10, and C20 in first column of matrix 41, descriptions of color difference components C01, C11, C21, C02, C12, and C22 are omitted.

Color difference components D00, D01, and D02 in the first row of matrix 42 are generated by image detection components G10, B11, G12, B13, and G14 in the second row of two-dimensional matrix 32. The color difference components D00, D01, and D02 can be recovered as (10)~(12).

$$D00 = B11 - \frac{(G10 + G12)}{2} \quad (10)$$

$$D01 = \frac{(B11 + B13)}{2} - G12 \quad (11)$$

$$D02 = B13 - \frac{(G12 + G14)}{2} \quad (12)$$

Color difference components D20, D21, and D22 in third row of matrix 42 are generated by image detection components G30, B31, G32, B33, and G34 in the fourth row of two-dimensional matrix 32. Since the operations of color difference components D20, D21, and D22 in the third row of matrix 42 are similar to that of color difference components D00, D01, and D02 in the first row of matrix 42, descriptions of color difference components D20, D21, and D22 are omitted.

Color difference components E00, E10, and E20 in first column of matrix 43 are generated by image detection components G01, B11, G21, B31, and G41 in the second column of two-dimensional matrix 32. The color difference components E00, E10, and E20 can be recovered as (13)~(15).

$$E00 = B11 - \frac{(G01 + G21)}{2} \quad (13)$$

$$E10 = \frac{(B11 + B31)}{2} - G21 \quad (14)$$

$$E20 = B31 - \frac{(G21 + G41)}{2} \quad (15)$$

Color difference components E02, E12, and E22 in the third column of matrix 43 are generated by image detection components G03, B13, G23, B33, and G43 in the fourth column of two-dimensional matrix 32. Since the operations of color difference components E02, E12, and E22 in the third column of matrix 43 are similar to that of color difference components E00, E10, and E20 in first column of matrix 43, descriptions of color difference components E02, E12, and E22 are omitted.

Color difference components F00, F01, and F02 in the first row of matrix 44 are generated by image detection components R00, G01, R02, G03, and R04 in the first row of two-dimensional matrix 32. The color difference components F00, F01, and F02 can be recovered as (16)~(18).

$$F00 = \frac{(R00 + R02)}{2} - G01 \quad (16)$$

$$F01 = R02 - \frac{(G01 + G03)}{2} \quad (17)$$

$$F02 = \frac{(R02 + R04)}{2} - G03 \quad (18)$$

Color difference components F10, F11, and F12 in the second row of matrix 44 are generated by image detection components R20, G21, R22, G23, and R24 in the third row of two-dimensional matrix 32. Color difference components F20, F21, and F22 in the third row of matrix 44 are generated by image detection components R40, G41, R42, G43, and R44 in the fifth row of two-dimensional matrix 32. Since the operations of color difference components F10, F11, and F12 in the second row of matrix 44 and color difference components F20, F21, and F22 in the third row of matrix 44 are similar to that of color difference components F00, F01, and F02 in the first row of matrix 44, descriptions of color difference components F10, F11, F12, F20, F21, and F22 are omitted.

Matrixes 41~44 are divided into a first matrix module and a second matrix module (step 213). In this embodiment, since image detection components in odd columns and in odd rows of two-dimensional matrix 32 correspond to red components and green components, and matrixes 41 and 44 are generated by image detection components in odd columns and in odd rows of two-dimensional matrix 32, matrixes 41 and 44 are divided into the first matrix group.

Additionally, since image detection components in even columns and in even rows of two-dimensional matrix 32 correspond to blue components and green components and matrixes 42 and 43 are generated by image detection components in even columns and in even rows of two-dimensional matrix 32, matrixes 42 and 43 are divided into the second matrix group.

The corresponding matrixes among the first matrix module or the second matrix module are calculated according to a first image detection component among the image detection components of two-dimensional matrix 32 to obtain various operation values (step 214). Since the image detection component R22 stored in a pixel unit 321 corresponds to red component, the missing components G22 and B22 could be obtained by calculating matrixes 41 and 44 as followed.

First, an average value C_V0 of first column color difference components of matrix 41 can be recovered as (19), an average value C_V1 of second column color difference components of matrix 41 can be recovered as (20), an average value C_V2 of third column color difference components of matrix 41 can be recovered as (21), an average value C_H0 of first row color difference components of matrix 41 can be recovered as (22), an average value C_H1 of second row color difference components of matrix 41 can be recovered as (23), and an average value C_H2 of third row color difference components of matrix 41 can be recovered as (24).

$$C\_V0 = \frac{C00 + C10 + C20}{3} \quad (19)$$

$$C\_V1 = \frac{C01 + C11 + C21}{3} \quad (20)$$

$$C\_V2 = \frac{C02 + C12 + C22}{3} \quad (21)$$

$$C\_H0 = \frac{C00 + C01 + C02}{3} \quad (22)$$

$$C\_H1 = \frac{C10 + C11 + C12}{3} \quad (23)$$

$$C\_H2 = \frac{C20 + C21 + C22}{3} \quad (24)$$

Next, an average value F_V0 of first column color difference components of matrix 44 can be recovered as (25), an average value F_V1 of second column color difference components of matrix 44 can be recovered as (26), an average value F_V2 of third column color difference components of matrix 44 can be recovered as (27), an average value F_H0 of first row color difference components of matrix 44 can be recovered as (28), an average value F_H1 of second row color difference components of matrix 44 can be recovered as (29), and an average value F_H2 of third row color difference components of matrix 44 can be recovered as (30).

$$F\_V0 = \frac{F00 + F10 + F20}{3} \quad (25)$$

$$F\_V1 = \frac{F01 + F11 + F21}{3} \quad (26)$$

$$F\_V2 = \frac{F02 + F12 + F22}{3} \quad (27)$$

$$F\_H0 = \frac{F00 + F01 + F02}{3} \quad (28)$$

$$F\_H1 = \frac{F10 + F11 + F12}{3} \quad (29)$$

$$F\_H2 = \frac{F20 + F21 + F22}{3} \quad (30)$$

Operation values CDVM_CV, CDVM_CH, CDVM_FV, and CDVM_FH are obtained according to the average values C_V0~C_V2, C_H0~C_H2, F_V0~F_V2, and F_H0~F_H2. Operation values CDVM_CV, CDVM_CH, CDVM_FV, and CDVM_FH can be recovered as (31)~(34).

$$CDVM\_CV = \frac{|C\_V1 - C\_V0| + |C\_V1 - C\_V2|}{2} \quad (31)$$

$$CDVM\_CH = \frac{|C\_H1 - C\_H0| + |C\_H1 - C\_H2|}{2} \quad (32)$$

$$CDVM\_FV = \frac{|F\_V1 - F\_V0| + |F\_V1 - F\_V2|}{2} \quad (33)$$

$$CDVM\_FH = \frac{|F\_H1 - F\_H0| + |F\_H1 - F\_H2|}{2} \quad (34)$$

A minimum value among the operation values CDVM_CV, CDVM_CH, CDVM_FV, and CDVM_FH is determined (step 215) and serves as a minimum operation value. The matrix corresponding to the minimum operation value serves as a minimum color difference variation matrix (MCDVM). For example, assuming that operation value CDVM_CV is the minimum. Operation value CDVM_CV is served as the minimum operation value and matrix 41 is served as the MCDVM.

The column color difference components or the row color difference components of the MCDVM are calculated according to the minimum operation value for obtaining a minimum color difference variation (step 216). In this embodiment, since the operation value CDVM_CV obtained according to the column color difference components of matrix 41 is the minimum operation value, the first, second, and third columns color difference components of matrix 41 are calculated for obtaining color difference variation clusters CDVC0~CDVC2. Color difference variation clusters CDVC0~CDVC2 can be recovered as (35)~(37).

$$CDVC0 = |2 \times C10 - C00 - C20| \quad (35)$$

$$CDVC1 = |2 \times C11 - C01 - C21| \quad (36)$$

$$CDVC2 = |2 \times C12 - C02 - C22| \quad (37)$$

A minimum color difference variation is obtained according to color difference variation clusters CDVC0~CDVC2. For example, when the color difference variation cluster CDVC0 is minimum, the color difference variation cluster CDVC0 serves as the minimum color difference variation.

Finally, an average value of the column or the row color difference components of the minimum color difference variation and the first image detection component R22 are calculated for obtaining the missing component G22 (step 217). The missing component G22 is calculated as:

$$G22 = R22 - C\_V0 \quad (38).$$

The missing component G22 is obtained when steps 210~217 shown as FIG. 2 are executed. When steps 214~217 are executed again for calculating the second matrix module, the missing component B22 is obtained.

The color interpolation processing method of the invention accurately calculates the missing component. The calculation of color interpolation processing method of the invention is simplified such that hardware cost is reduced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A color interpolation processing method, comprising:
capturing a scene constituted by at least three preset color components;
generating a two-dimensional matrix according to the scene, wherein the two-dimensional matrix comprises a plurality of image detection components, each corresponding to one of the preset color components;
generating a plurality of matrixes according to the image detection components, wherein each matrix comprises a plurality of column color difference components or a plurality of row color difference components;
dividing the matrixes into a first matrix module and a second matrix module;
calculating the column color difference components and the row color difference components among the first or the second matrix module for obtaining a plurality of operation values according to the preset color corresponding to a first image detection component among the image detection components;
determining a minimum value among the operation values to serve as a minimum operation value, wherein the matrix corresponding to the minimum operation value is served as a minimum color difference variation matrix (MCDVM);
calculating the column color difference components or the row color difference components of the MCDVM for obtaining a minimum color difference variation according to the minimum operation value; and
calculating an average value of the column or the row color difference components of the minimum color difference variation and the first image detection component.

2. The color interpolation processing method as claimed in claim 1, wherein the first matrix module comprises a first matrix generated by the image detection components in odd columns of the two-dimensional matrix and a second matrix generated by the image detection components in odd rows of the two-dimensional matrix, and the second matrix module comprises a third matrix generated by the image detection components in even rows of the two-dimensional matrix and a fourth matrix generated by the image detection components in even columns of the two-dimensional matrix.

3. The color interpolation processing method as claimed in claim 2, wherein one of the color difference components of the first matrix equals $$\frac{(R00 + R20)}{2} - G10,$$

R00 is a first image detection component among the image detection components of a first odd column of the two-dimensional matrix, G10 is a second image detection component among the image detection components of the first odd column of the two-dimensional matrix, and R20 is a third image detection component among the image detection components of the first odd column of the two-dimensional matrix.

4. The color interpolation processing method as claimed in claim 2, wherein one of the color difference components of the third matrix equals $$B11 - \frac{(G10 + G12)}{2},$$

is a first image detection component among the image detection components of a first even row of the two-dimensional matrix, B11 is a second image detection component among the image detection components of the first even row of the two-dimensional matrix, G12 is a third image detection component among the image detection components of the first even row of the two-dimensional matrix.

5. The color interpolation processing method as claimed in claim 1, wherein the operation value (CDV_CV) equals $$\frac{|C\_V1 - C\_V0| + |C\_V1 - C\_V2|}{2},$$

C_V0 is an average value of color difference components of a first column of the MCDVM, C_V1 is an average value of color difference components of a second column of the MCDVM, and C_V2 is an average value of color difference components of a third column of the MCDVM.

6. The color interpolation processing method as claimed in claim 1, wherein the minimum color difference variation is defined from one of a first color difference variation, a second color difference variation, and a third color difference variation of the MCDVM.

7. The color interpolation processing method as claimed in claim 6, wherein the first color difference variation equals |2×C10−C00−C20|, C00 is a first color difference component in the first column of the MCDVM, C10 is a second color difference component in the first column of the MCDVM, and C20 is a third color difference component in the first column of the MCDVM.

8. The color interpolation processing method as claimed in claim 6, wherein a color among RGB colors is obtained when the average value of the column or the row color difference components of the minimum color difference variation and the first image detection components are calculated.

* * * * *